(12) United States Patent
Heim et al.

(10) Patent No.: US 8,931,626 B2
(45) Date of Patent: Jan. 13, 2015

(54) SYSTEM FOR THE SURFACE TREATMENT OF OBJECTS

(75) Inventors: Juergen Heim, Bisingen (DE); Eckard Riemrich, Rottenburg (DE)

(73) Assignee: Eisenmann AG, Boeblingen (DE)

( * ) Notice: Subject to any disclaimer, the term of this patent is extended or adjusted under 35 U.S.C. 154(b) by 545 days.

(21) Appl. No.: 13/122,649

(22) PCT Filed: Oct. 17, 2009

(86) PCT No.: PCT/EP2009/007468
§ 371 (c)(1), (2), (4) Date: Apr. 5, 2011

(87) PCT Pub. No.: WO2010/051910
PCT Pub. Date: May 14, 2010

(65) Prior Publication Data
US 2011/0284343 A1    Nov. 24, 2011

(30) Foreign Application Priority Data
Nov. 8, 2008    (DE) .......................... 10 2008 056 142

(51) Int. Cl.
| | |
|---|---|
| B65G 49/02 | (2006.01) |
| B05B 13/04 | (2006.01) |
| B05B 15/12 | (2006.01) |
| F03D 1/06 | (2006.01) |

(52) U.S. Cl.
CPC ......... *B05B 13/0436* (2013.01); *B05B 13/0457* (2013.01); *B05B 15/12* (2013.01); *B05B 15/1292* (2013.01); *F03D 1/06* (2013.01); *B05B 15/1214* (2013.01); *B65G 49/02* (2013.01); *F05B 2230/90* (2013.01); *Y02E 10/721* (2013.01); *F16C 2360/31* (2013.01)
USPC ..................... 198/725; 198/463.3; 198/468.6; 198/802

(58) Field of Classification Search
None
See application file for complete search history.

(56) References Cited

U.S. PATENT DOCUMENTS

| | | | |
|---|---|---|---|
| 7,238,392 B2 * | 7/2007 | Kyotani ..................... | 427/430.1 |
| 2007/0272150 A1 * | 11/2007 | Swoboda et al. ............. | 118/642 |
| 2010/0047465 A1 | 2/2010 | Ansorge et al. | |

FOREIGN PATENT DOCUMENTS

| | | |
|---|---|---|
| DE | 94 18 619 A1 | 4/1995 |
| DE | 197 39 326 C1 | 4/1999 |
| DE | 101 11 378 C1 | 7/2002 |
| DE | 101 18 906 A1 | 11/2002 |
| DE | 10 2005 032 124 A1 | 1/2007 |
| EP | 1 632 444 A1 | 3/2006 |

OTHER PUBLICATIONS

International Search Report of PCT/EP2009/007468, International Filing Date of Oct. 17, 2009, 5 pages.

* cited by examiner

*Primary Examiner* — Kavel Singh
(74) *Attorney, Agent, or Firm* — Factor Intellectual Property Law Group, Ltd.

(57) ABSTRACT

The invention relates to a system for the surface treatment of objects, comprising a treatment cabinet having an entry and an exit and a conveyor system comprising pulling or pushing means, by means of which an object can be conveyed in circulation in a transport direction through the treatment cabinet, thereby covering a transport distance. The object provides a transport length in the transport direction associated therewith, and the pulling or pushing means provide a drive distance in the transport direction. The conveyor system comprises a coupling device, by means of which the object can be coupled to the pulling or pushing means along the drive distance. The drive distance is shorter than the transport length of the object in the transport direction, and the coupling device is aligned so that the transport distance that can be covered by the object is longer than the drive distance.

16 Claims, 9 Drawing Sheets

SYSTEM FOR THE SURFACE TREATMENT OF OBJECTS

RELATED APPLICATIONS

This application claims the filing benefit of International Patent Application No. PCT/EP2009/007468, filed Oct. 17, 2009, which claims the filing benefit of Germany Patent Application No. 10 2008 056 142.8 filed Nov. 8, 2008, the contents of both of which are incorporated herein by reference.

The invention relates to a system for the surface treatment of objects, having
a) a treatment booth with an entry and an exit;
b) a conveying system which includes pulling or pushing means by means of which an object may be conveyed by passing through the treatment booth in a direction of transport, and in so doing covers a transport distance;
in which
c) the object predetermines a transport length that is associated therewith in the direction of transport, and
d) the pulling or pushing means predetermine a drive distance in the direction of transport.

The term "drive distance" is understood to be the distance along which the pulling or pushing means can exert a drive on the object. If a circulating chain is used as the pulling or pushing means, as is the case in systems of this kind that are known on the market, the drive distance is typically the extent of the chain between a first point at which the chain is coupled to the object and a second point at which this coupling is disconnected again. In the case of systems known on the market, the transport distance covered by the object therefore conventionally corresponds to the drive distance.

BACKGROUND OF THE INVENTION

In systems known on the market, the size of the treatment booth, often a painting booth, in which the object is painted is adapted to the length and shape of the objects to be treated. This means that the object is put entirely inside the treatment booth and undergoes surface treatment there. Rather than being painted, this treatment may also mean, for example, drying of a coating which has already been applied to the object, cleaning of the surface thereof or similar.

When objects are painted, not all the paint applied reaches the object. Some of the paint is deposited in the interior of the booth, as so-called paint overspray. To remove this from the booth, air is fed through the painting booth and carries the paint overspray along with it. The air absorbing the paint overspray is then supplied to a processing step. In the case of a painting booth as the treatment booth, means of controlling the air management are therefore necessary.

If very large objects, which may have a length of 50 m or more, are to be painted, such as rotor blades for wind turbines, correspondingly large painting booths have to be built so that these objects can be entirely contained. Painting is carried out by means of application robots, which are known per se. The latter have to be able to move along the stationary object to be painted at a constant speed so that all the regions of the object can be coated in a reliably even manner. Usually, seven-axis robots are used, the seventh axis being the axis of movement.

A large-scale booth of this kind requires large quantities of air, which can only be handled using correspondingly complex and large and hence high-cost ventilation systems. Moreover, the system as a whole is very long if operation is by passage through it, which is desirable from the point of view of a high throughput through the system. Typically, a length at least three times that of the object to be coated is required. As well as the painting booth, on the one hand a region upstream thereof and on the other a region downstream thereof is required, each one having to be as long as the object to be painted. Only in this way can the object be moved upstream of the entry to the treatment booth and, after treatment, be taken away from the system downstream of the exit from the treatment booth without difficulty.

To save space in the case of a system operated by passage through it, however, it is only possible to construct the treatment booth to be shorter. There is no room for adjustment upstream and downstream of the treatment booth.

Although it is possible in the case of a treatment booth, in particular a painting booth, which is shorter than the object to be treated to use fixed application robots, which makes it easier to control the painting procedure, the disadvantage in this case is that the object must be conveyed through the painting booth and past the application robots evenly and as far as possible without jolting, in order to ensure that the object is coated evenly.

If a pulling or pushing means such as a chain provides the drive for a long object over the entire transport path thereof—in other words, if the drive distance is the same as the transport distance—then typically jolting while the object is being moved is unavoidable, however, in particular at low speeds. This is not acceptable in the case of a painting booth that is shorter than the object to be painted, however, since the result would be a relatively poor painting outcome.

The present invention is directed to resolving these and other matters.

SUMMARY OF THE INVENTION

It is therefore an object of the invention to construct a system of the type mentioned at the outset such that a treatment booth can be used which is shorter than the transport length of the object but in which jolt-free transport of the object by means of the pulling or pushing means is at the same time ensured.

This object may be achieved in the case of a system mentioned at the outset in that
d) the conveying system includes a coupling means by means of which the object may be coupled to the pulling or pushing means along the drive distance;
e) the drive distance is shorter in the direction of transport than the transport length of the object; and
f) the coupling means is set up such that the transport distance to be covered by the object is longer than the drive distance.

According to the invention, the length of the drive path is thus shortened to a length less than the transport length of the object. Consequently, a pulling or pushing means which is shorter than in known systems is used. The shorter the pulling or pushing means, the less the risk that undesirable jolting will occur during transport of the object.

In the case of a drive distance that is shorter than the required length of the transport path of the object, however, if the object is coupled directly to the pulling or pushing means, it can only be conveyed over a distance whereof the length corresponds to the drive distance. However, the object must be conveyed over a longer distance if the whole of it is to be transported through the treatment booth.

For this reason, the shortened drive distance is artificially lengthened by means of the coupling means, as a result of which the object can be moved over a transport distance that is longer than the drive distance.

Advantageous embodiments are indicated in the dependent claims.

As the pulling or pushing means, there may for example serve a cable. However, it is more advantageous if the pulling or pushing means take the form of a circulating conveyor chain, with the drive distance predetermined by at least one region of one side of the conveyor chain.

Advantageously, the lengthening of the transport distance for the object which is made possible by the pulling or pushing means is achieved in that the coupling means includes a conveying slide which a) is longer in the direction of transport than the drive distance;
b) includes a plurality of entraining elements which are arranged along the conveying slide spaced from one another in the direction of transport and may cooperate with the pulling or pushing means; and
c) is movable in the direction of transport in a guide structure.

In this case, it is particularly advantageous if the conveying slide is of a length corresponding approximately to the transport length of the object.

With this construction, the conveying slide may always remain coupled to the pulling or pushing means, even when it extends in the direction of transport or the opposite direction thereto beyond the drive distance of the pulling or pushing means.

The object to be treated may on the one hand be carried by the conveying slide. On the other hand, it is advantageous if the conveying system includes at least one transport carriage which receives the object and which is itself connectable to the conveying slide. In this case, the object may remain on the separately movable transport carriage once the treatment is complete and be supplied to any necessary post-treatment of the transport carriage.

If the treatment booth is shorter than the object to be treated, the latter must necessarily project out of the booth at the entry and exit thereof while it is moved therethrough. As regards the air management in the booth, it is desirable if the opening is as small as possible at the entry and exit of the treatment booth so that only a small quantity of exhaust air can escape or unconditioned air enter the treatment booth from the outside.

This can be achieved in that the treatment booth has at its entry and/or at its exit a booth gate which includes at least one gate leaf that is movable in a first direction, in particular a roller gate leaf, and at least one gate leaf that is movable in a second direction, in particular a roller gate leaf. In this way, at the entry and/or at the exit of the treatment booth a passage can be created whereof the external contour can be adapted to the section of the object that is respectively passing through. The gap remaining between the door leaves and the object is always kept as small as possible so that the air has hardly any opportunity to pass through.

In this case, it is particularly advantageous from the point of view of construction engineering if the first direction runs vertically and the second direction runs horizontally.

If two gate leaves which are movable in the first direction are provided, the external contour of the passage can be even better adapted to the object.

It is to be understood that the aspects and objects of the present invention described above may be combinable and that other advantages and aspects of the present invention will become apparent upon reading the following description of the drawings and detailed description of the invention.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 1:
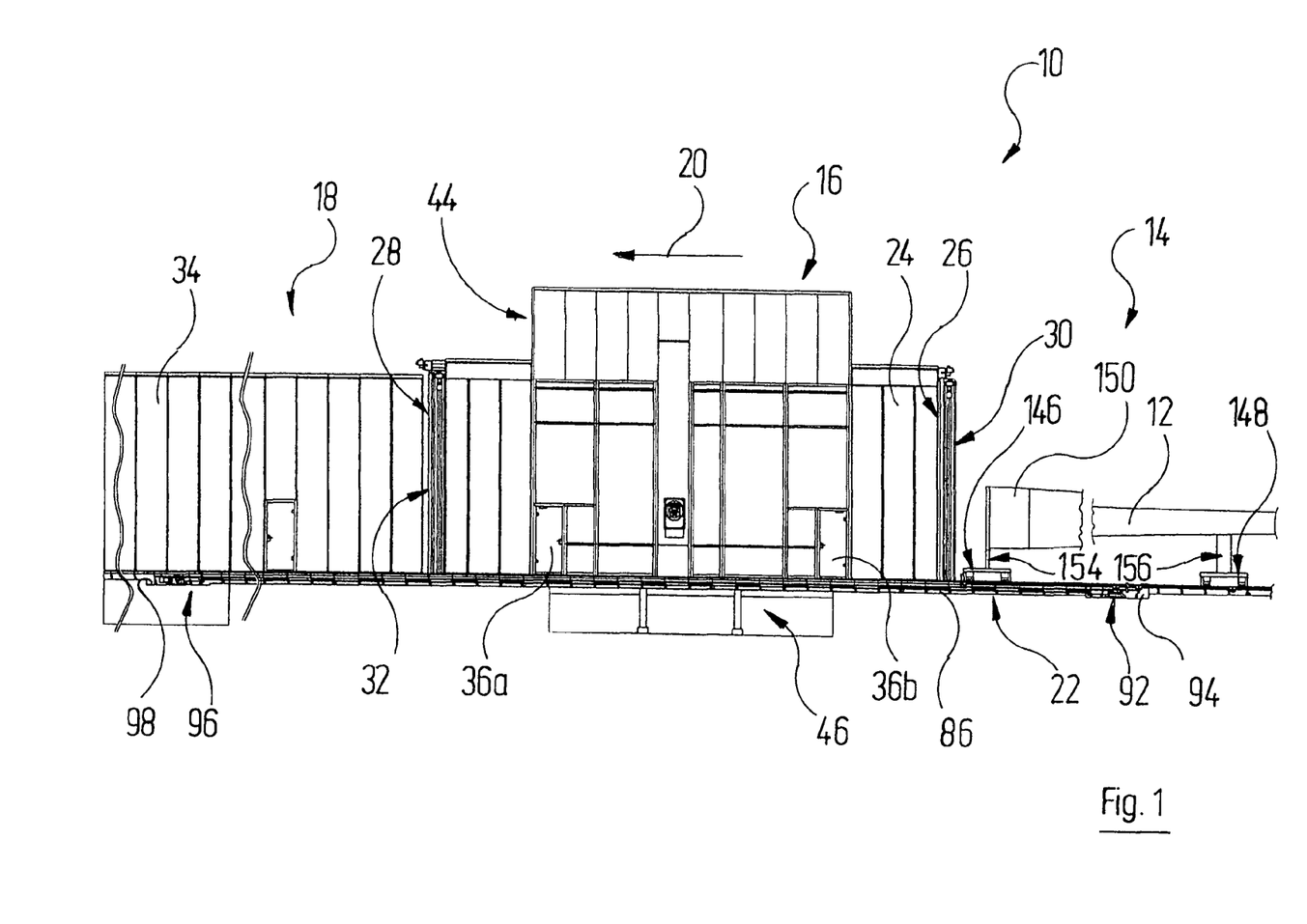
FIG. 1 shows a side view of a system for the surface treatment of objects.
Figure 2:
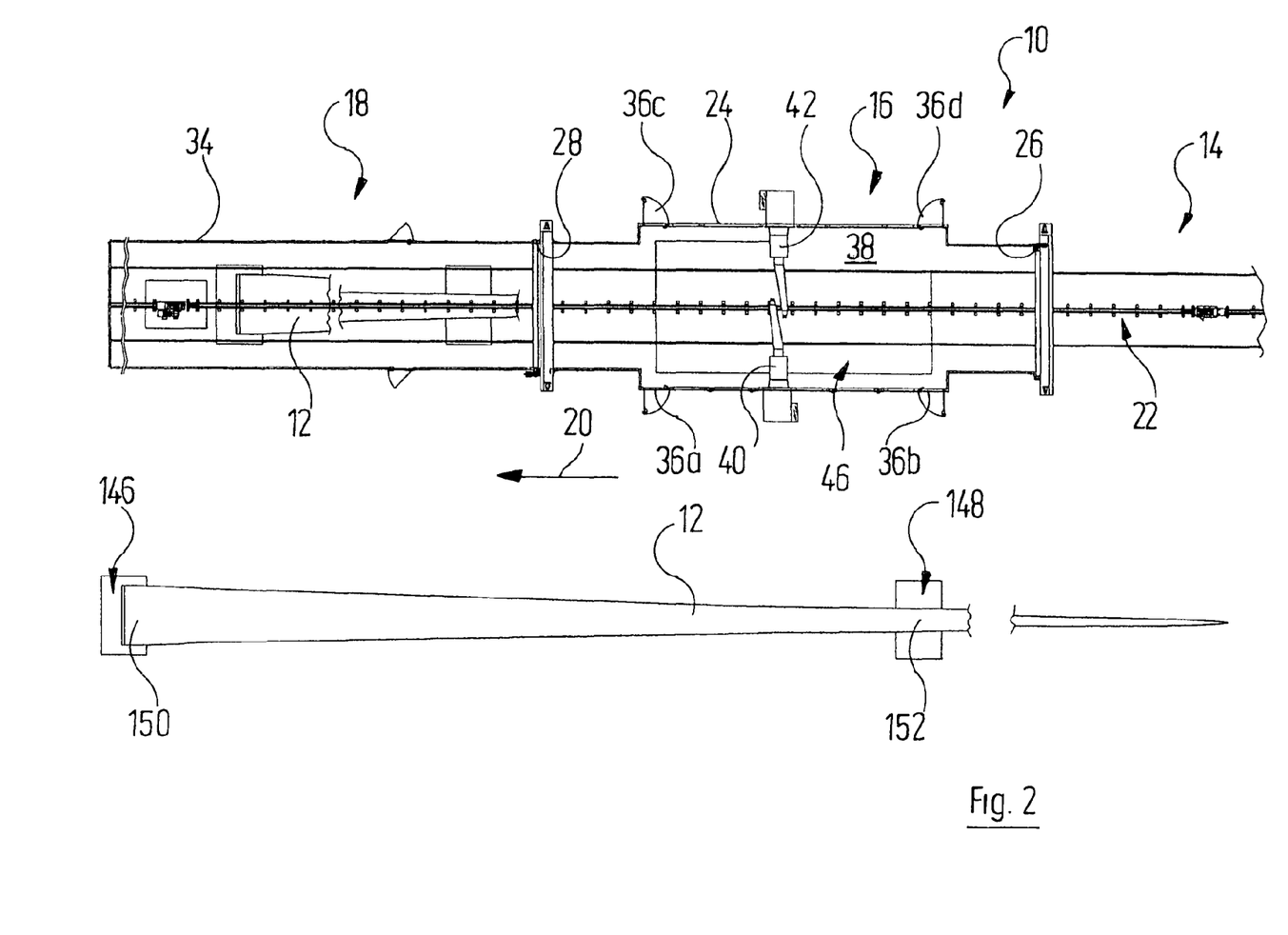
FIG. 2 shows the system from FIG. 1 in a through view from above, alongside a rotor blade for a wind turbine, which is to be treated.

FIGS. 1 and 2 show a surface treatment system 10 in which so-called overlong objects, having a length of over 10 m, can be treated by passing through it. The figures show an object of this kind in the form of a rotor blade 12 for wind turbines. Rotor blades for wind turbines, which may be 50 m long or more, are objects of a finite length which are rigid other than having an intrinsic elasticity resulting from the material used. For this reason, the system 10 designed for objects of this kind must meet different criteria from those of, for example, a system for the surface treatment of movable and in some cases endless objects such as chains or the like.

The system 10 includes a supply region 14, a spray booth 16 and a transfer chamber 18. These are arranged one behind the other in a direction of transport 20, in which the rotor blade 12 to be treated is conveyed through the spray booth 16. For conveying the rotor blade 12 there is provided a conveying system 22 which will be explained in more detail below. In the position in which the rotor blade 12 is moved through the system 10, it predetermines a transport length associated with the rotor blade 12, in the direction of transport 20. The same also applies accordingly for other objects to be treated.

Figure 3:
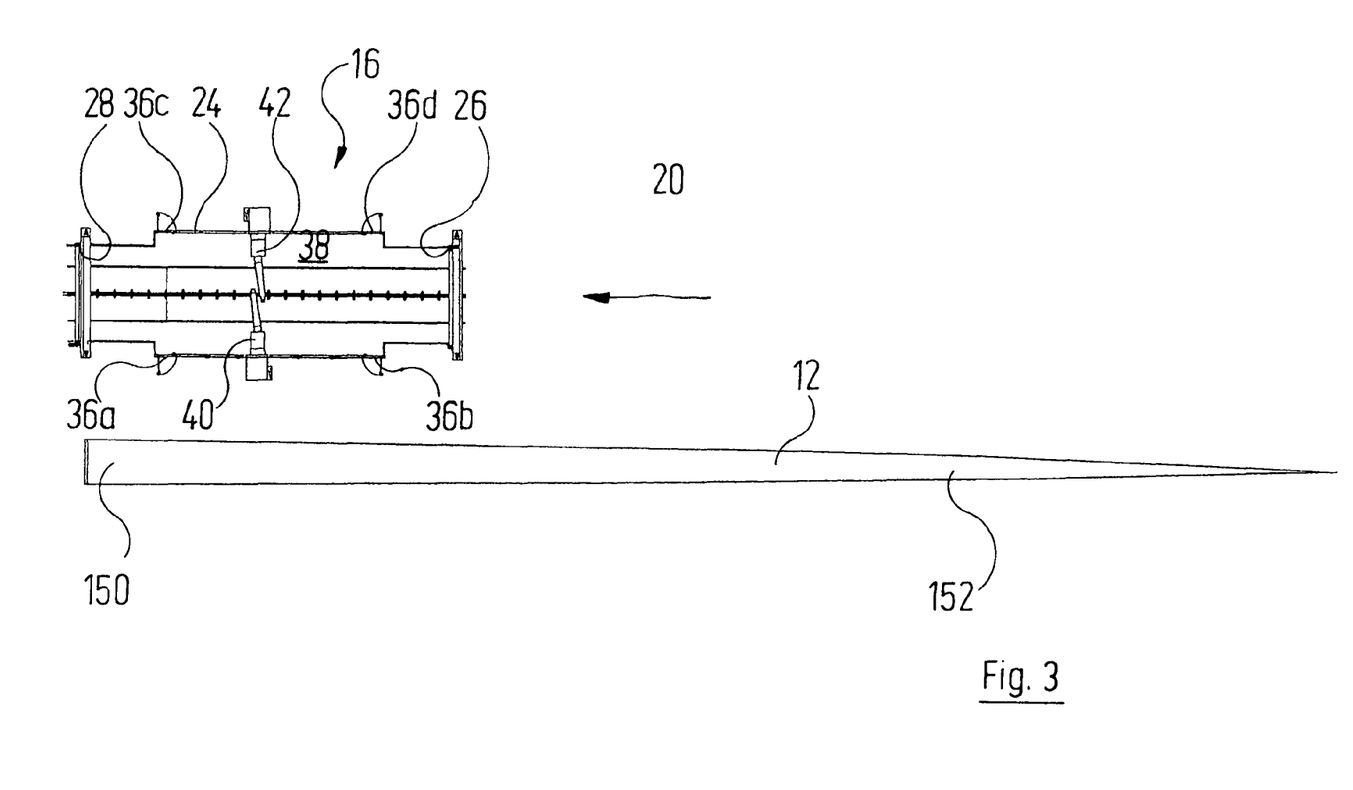
FIG. 3 shows a view of the treatment booth corresponding to the view in FIG. 2, alongside the rotor blade from FIG. 2, shown in its entirety.

The supply region 14 and the transfer chamber 18 are somewhat longer in the direction of transport 20 than the rotor blade 12 to be treated. In FIG. 3, the spray booth 16 is shown separately, alongside the rotor blade 12, which is shown in its entirety. As can be seen from this, the spray booth 16 has a length markedly shorter than that of the rotor blade 12.

The spray booth 16 includes a housing 24 having an entry 26 adjacent to the supply region 14 of the system 10, and an exit 28 between the spray booth 16 and the transfer chamber 18. The entry 26 to the spray booth 16 may be closed or released by means of a booth gate 30. A booth gate 32 of similar construction is located at the exit 28 of the spray booth 16. This latter gate allows the passage through the spray booth 16 to the transfer chamber 18, which for its part is delimited by a housing 34, to be closed or released.

The spray booth 16 is accessible from the outside to operating staff by way of doors 36a, 36b, 36c and 36d which are arranged around it, for example for the purpose of inspection or maintenance. In the interior 38 of the spray booth 16, two application robots 40 and 42, which are equipped with a spray gun and have at least three axes of movement, as are known per se, are arranged to right and left of the conveying path of the rotor blade 12. The application robots 40, 42 are arranged to be fixed, that is they cannot move around within the spray booth 16. The greatest mobility of the application robots 40 and 42 is achieved if they have six axes of movement, as is known per se. The application robots 40, 42 can be used to provide the surface of the rotor blade 12 with a coating, in particular a paint.

Figure 4:
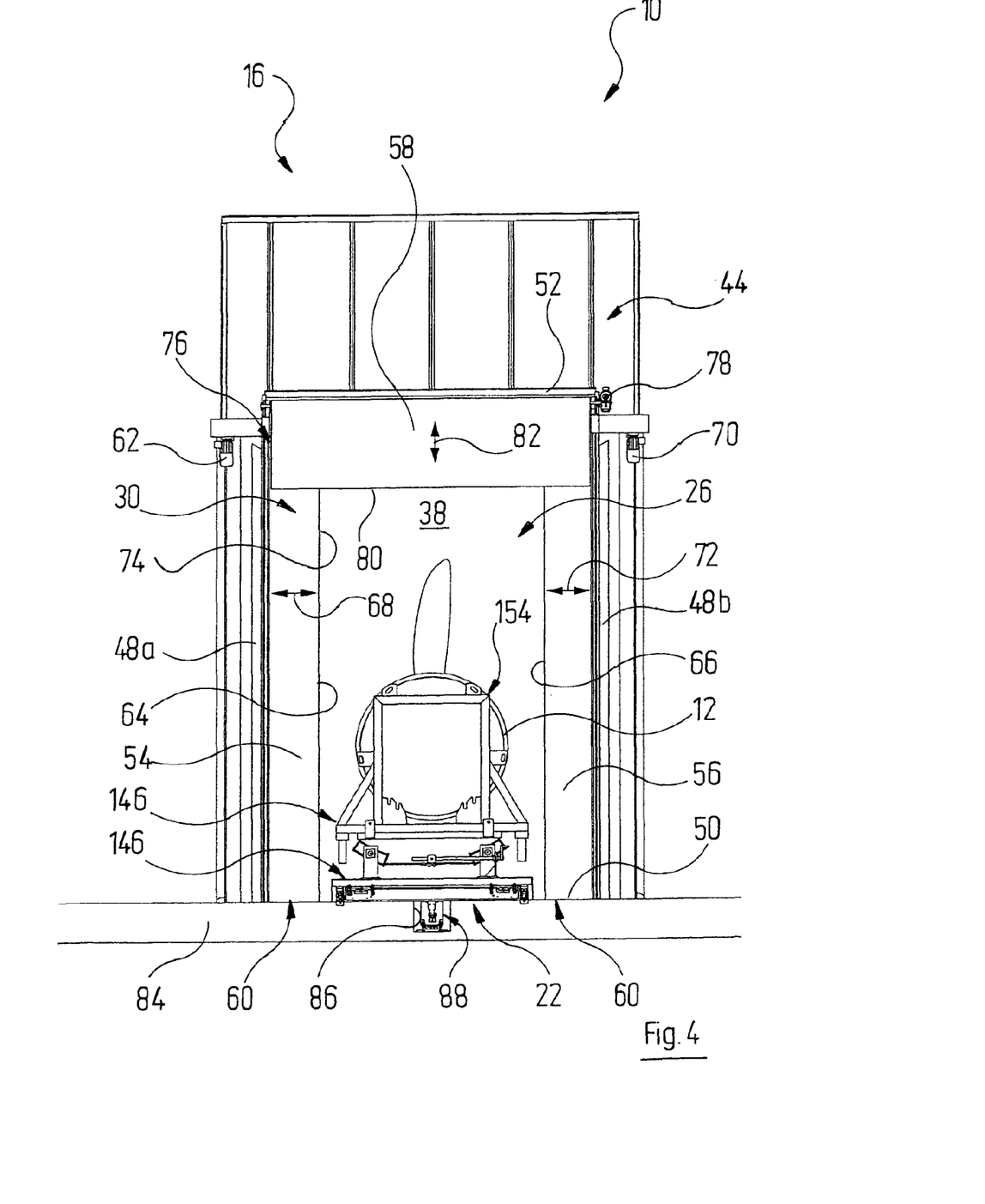
FIG. 4 shows a front view of the treatment booth, in which a floor region having a conveying system is visible.

Components by means of which the air management inside the spray booth 16 can be controlled and the required air may where appropriate be cleaned, e.g. filtered and/or pre-conditioned, for example being warmed or cooled and moistened, are accommodated in a ceiling region 44 of the spray booth 16 (cf. FIGS. 1 and 4). The air is distributed evenly in the booth by being guided through filter elements. Components of this kind are known per se and so they are not themselves shown. The interior 38 of the spray booth 16 is furthermore in communication with a duct system through which air can be guided through the spray booth 16 and which is only indicated in FIGS. 1 and 2 by a duct region 46 below the spray booth 16. The duct system connects the spray booth 16 to an infeed/exhaust air and/or circulating air system which can be operated in any ratio of fresh air/exhaust air/circulating air mixture. Air conditioning is performed within this system.

As can be seen from the front view of the spray booth 16 shown in FIG. 4, the entry 26 thereto is delimited laterally by two vertical struts 48a and 48b, below largely by the floor surface 50, and above by a horizontal strut 52.

The booth gate 30 at the entry 26 to the spray booth 16 includes a first and a second vertical roller gate leaf 54 and 56 respectively and a horizontal roller gate leaf 58. The vertical roller gate leaves 54 and 56 run at the top and bottom in a guide structure 60 and a vertical guide plane, which is common to these and extends perpendicular to the direction of transport 20.

The first vertical roller gate leaf 54 may be moved into or out of the region of the entry 26 to the spray booth 16 by means of a first electric motor 62 such that its vertically extending outer edge 64 moves towards or away from the corresponding opposing vertical outer edge 66, parallel thereto, of the second vertical roller gate leaf 56, indicated by a double-headed arrow 68. Correspondingly, the second vertical roller gate leaf 56 may be moved by means of a second electric motor 70 such that its vertically extending outer edge 66 moves in relation to the vertical outer edge 64 of the first vertical roller gate leaf 54. This is illustrated by the double-headed arrow 72. The respective portion of the roller gate leaves 54, 56 which is not in the region of the entry 26 to the spray booth 16 is wound onto a vertical shaft, not visible here.

If the two electric motors 62 and 68 are operated synchronously and in the same direction, the spacing between the opposing outer edges 64 and 66 of the vertical roller gate leaves 54 and 56 does not vary. In this way, however, the position of the passage 74 remaining between the roller gate leaves 54, 56 and 58 may be varied in relation to the lateral delimitations of the entry 26 to the spray booth 16 that are predetermined by the vertical struts 48a, 48b.

The dimensions of the passage 74 in the vertical direction may be varied by the horizontal roller gate leaf 58. For this purpose, the latter runs laterally in a guide structure 76 and may be moved into and out of the region of the entry 26 in the vertical direction by means of a third electric motor 78 such that the lower outer edge 80 of the horizontal roller gate leaf 58 moves up or down. This is illustrated by the double-headed arrow 82.

The vertical roller gate leaf 54 always closes the region between its outer edge 64 and the vertical strut 48a, the vertical roller gate leaf 56 always closes the region between its outer edge 66 and the vertical strut 48b, and the horizontal roller gate leaf 58 always closes the region between its outer edge 80 and the horizontal strut 52.

As a result of the options for moving the roller gate leaves 54, 56 and 58 in accordance with the double-headed arrows 68, 72 and 82 respectively, the external contour of the passage 74 remaining between the roller gate leaves 54, 56 and 58 may be varied. This point will be returned to in more detail below.

The floor base 84 of the system 10 has in the centre an upwardly open floor duct 86 (cf. FIGS. 4 and 8) which extends along the supply region 14, the spray booth 16 and the transfer chamber 18. Arranged in the floor duct 86 is a drive means 88 for the conveying system 22.

Figure 5:
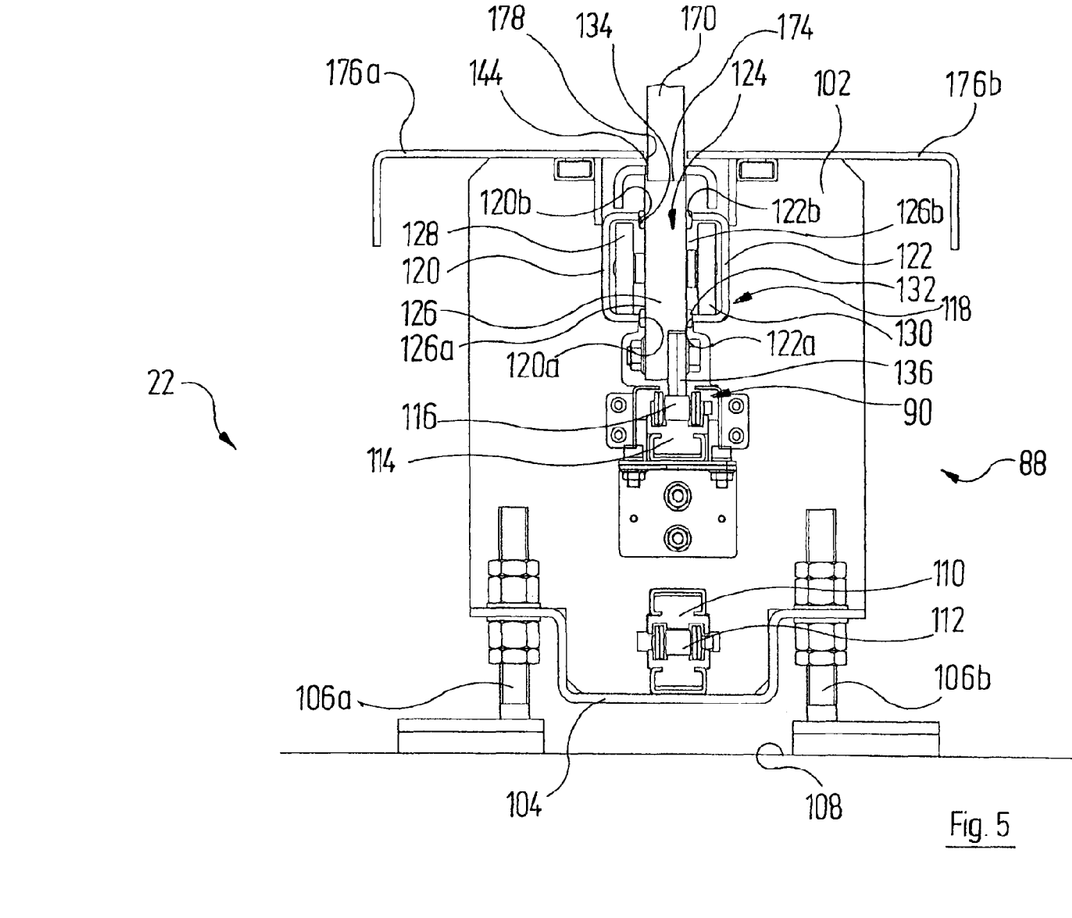
FIG. 5 shows a detail of the conveying system from FIG. 4, on a larger sale than the latter.
Figure 7:
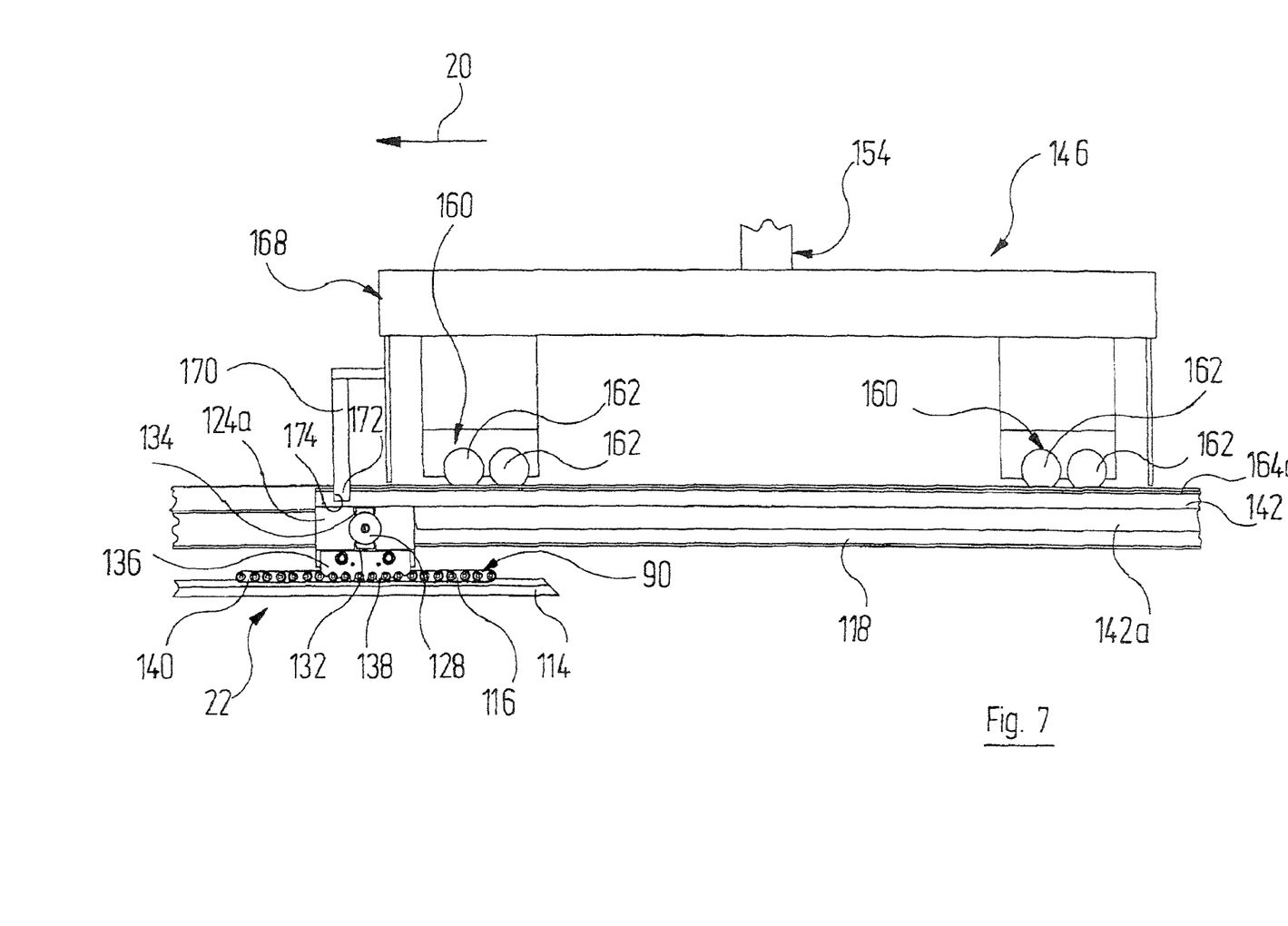
FIG. 7 shows a further detail of the conveying system, on an even larger scale.
Figure 8:
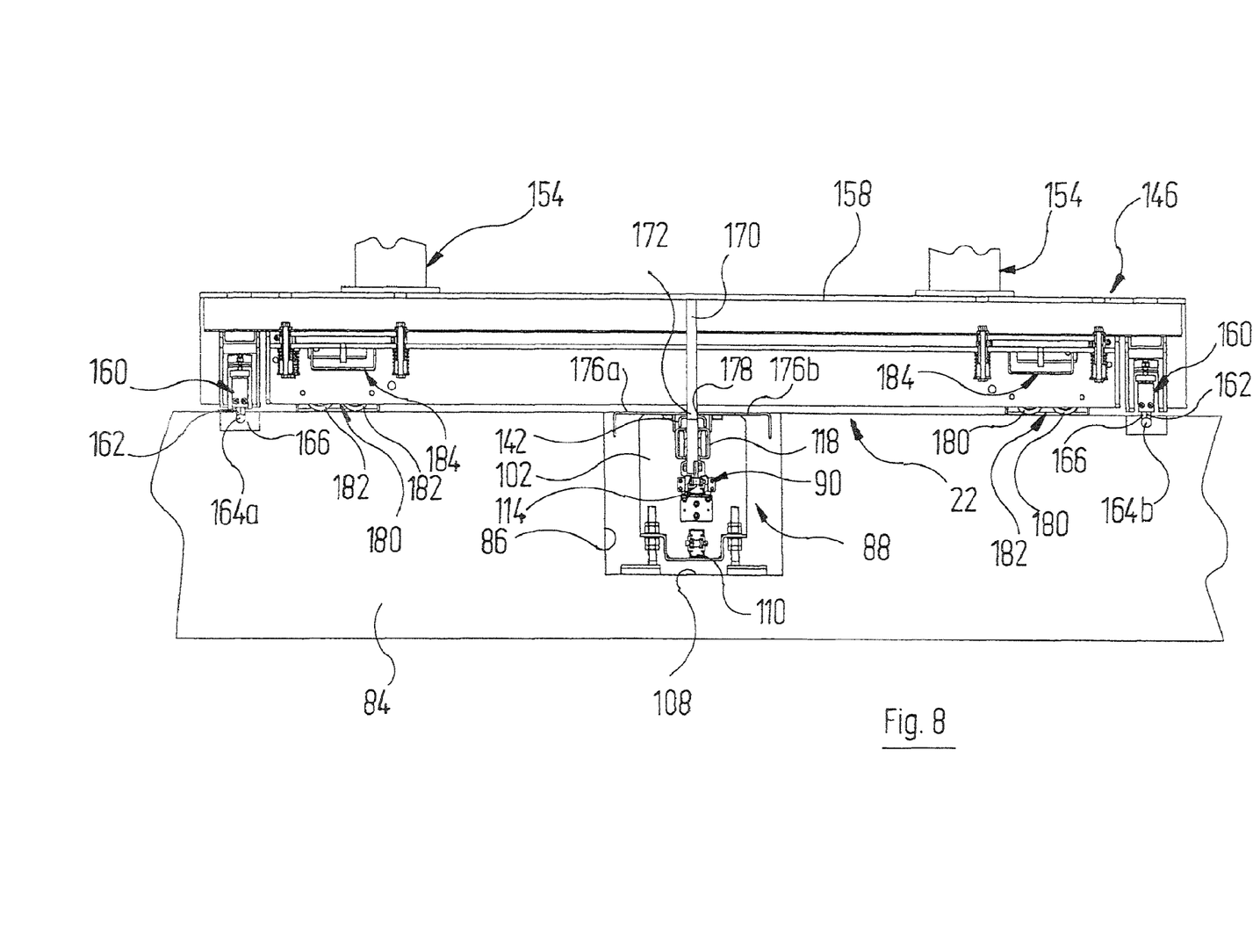
FIG. 8 shows once again a view of the conveying system corresponding to FIG. 4, on a larger scale than the latter.

The drive means 88 includes, as the pulling or pushing means, an endless conveyor chain 90 which is visible in FIGS. 5, 7 and 8 and goes around between a clamping station 92, arranged upstream of the spray booth 16 as seen in the direction of transport 20, in a widened portion 94 of the floor duct 86, and a drive station 96 which is arranged downstream of the spray booth 16 as seen in the direction of transport 20, in a widened portion 98 of the floor duct 86 (cf. FIG. 1). Clamping stations of this kind and drive stations of this kind are known from the prior art and so require no further explanation.

Figure 6:
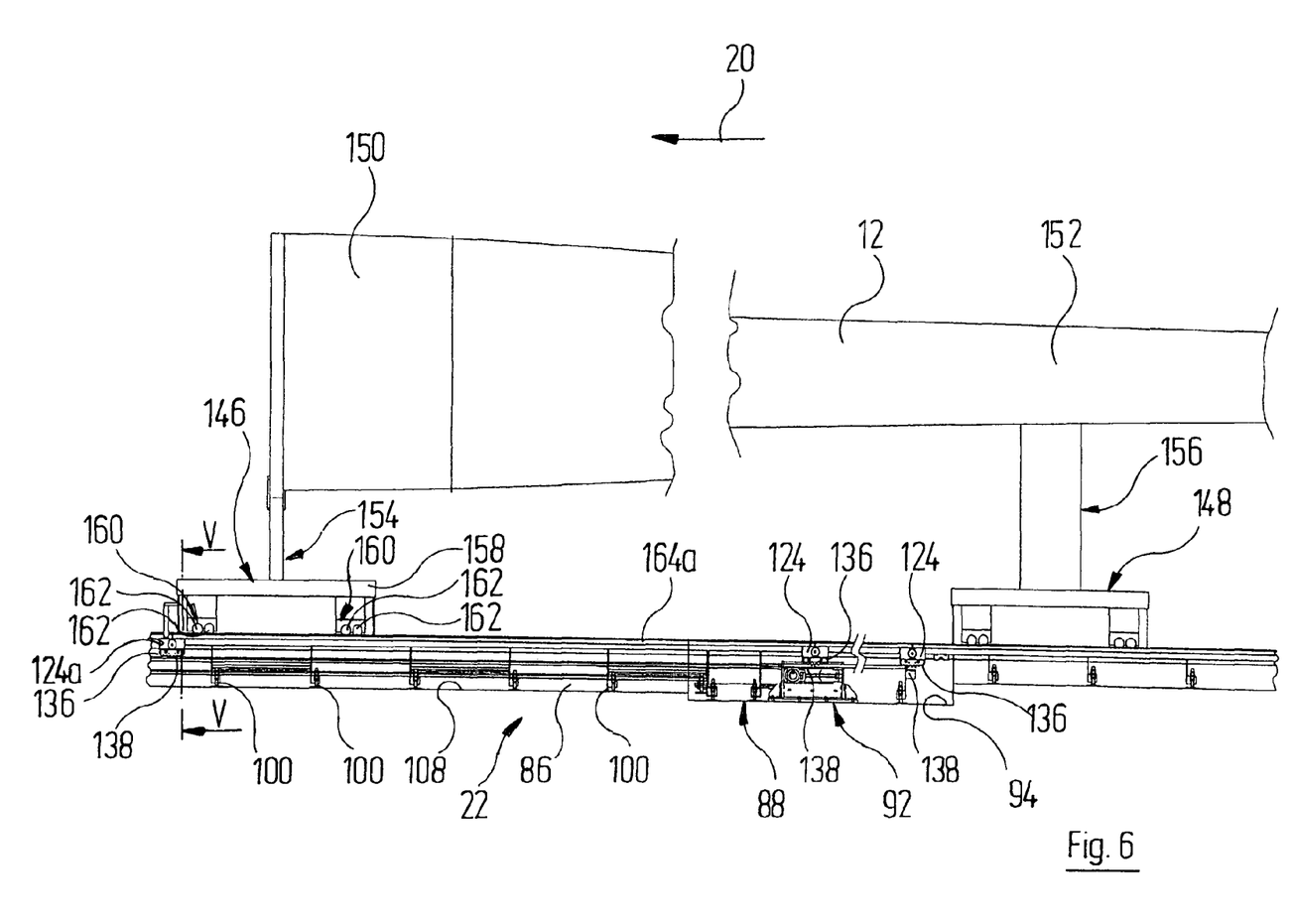
FIG. 6 shows a detail of the conveying system, in a side view corresponding to FIG. 1, on a larger scale than the latter.

As can be seen in particular from FIG. 6, the drive means 88 further includes a plurality of support structures 100 which are arranged one after the other as seen in the direction of transport 20, maintaining a spacing, and of which one is visible in FIG. 5. The supporting structure 100 includes a carrier plate 102 which is made for example from sheet steel and is arranged perpendicular to the direction of transport 20 and rests on an angled carrier sheet 104 which for its part is mounted on two short support columns 106a, 106b which are anchored on the duct base 108 of the floor duct 86 in a manner known per se.

The carrier plate 102 of the support structure 100 carries, from the bottom up, a lower chain rail 110, which guides the lower side 112 of the conveyor chain 90, and an upper chain rail 114 which runs parallel thereto and guides the upper side 116 of the conveyor chain 90. The chain rails 110 and 114 extend between the clamping station 92 and the drive station 96 of the drive means 88. The lower side 112 and the upper side 116 of the conveyor chain 90 extend between a deflecting pinion (not illustrated) on the clamping station 92 and a driven deflecting pinion (similarly not illustrated) on the drive station 96. The extent of the upper side 116 of the conveyor chain 90 defines a drive distance along which the rotor blade 12 can be coupled to the conveyor chain 90 in order to advance it, as will be explained in more detail below.

The upper side 116 of the conveyor chain 90 and hence the drive distance are thus at least as long as the spacing between the entry 26 and the exit 28 of the spray booth 16 plus twice the length of the entraining comb 136 of the entraining carriages 124 in the direction of transport 20.

Above the upper chain rail 114, the carrier plate 102 further carries a guide rail 118 formed by two C-shaped profiles 120, 122. The C-shaped profiles 120, 122 are arranged such that their longitudinal edges 120a, 120b and 122a, 122b respectively lie opposite one another, maintaining a spacing. The guide rail 118 extends along the entire system 10, including the supply region 14, the spray booth 16 and the transfer chamber 18.

Between the longitudinal edges 120a, 120b and 122a, 122b respectively of the C-shaped profiles 120, 122, a plurality of entraining carriages 124 are arranged along the guide rail 118, and these include a carriage plate 126 which runs in a vertical plane parallel to the direction of transport 20. On each surface side 126a, 126b, the carriage plate 126 carries a respective carrier roller 128 and 130 respectively, and these are mounted to be rotatable about a horizontal axis. The carrier rollers 128, 130 run on the respective lower limb of the C-shaped profiles 120, 122, which is not itself provided with a reference numeral.

The carriage plate 126 further carries a lower guide roller 132 and an upper guide roller 134 which are each mounted to be rotatable about a vertical axis. On either surface side 126a, 126b of the carriage plate 126, the guide rollers 132, 134 project beyond it and, in the vertical direction, are arranged at a height such that the lower guide roller 132 can roll on one of the lower outer edges 120a or 122a of the C-shaped profiles 120 and 122 respectively, whereas the upper guide roller 134 can roll on one of the upper outer edges 120b, 122b thereof. This prevents the entraining carriage 124 from tilting sideways.

The carriage plates 126 of the individual entraining carriages 124 carry a vertically downwardly projecting entraining comb 136 having a plurality of teeth 138. These are readily visible in FIGS. 6 and 7, in each case only one tooth 138 being provided with a reference numeral there. The entraining comb 126 is of a geometry such that it engages by means of its teeth 138 in the chain links 140 of the conveyor chain 90 of the drive means 88 when the entraining carriage 124 is located above the conveyor chain 90. This is shown in FIG. 7 through the example of the entraining carriage 124a which is furthest forward as seen in the direction of transport, in this figure only a partial portion of the upper side 116 of the conveyor chain 90 which runs on the upper chain rail 114 being shown in detail. In this way, each entraining carriage 124 that is located above the conveyor chain 90 is entrained by the upper side 116 of the conveyor chain 90 and is moved along the guide rail 118, in a manner corresponding to the direction of rotation of the conveyor chain 90.

The individual entraining carriages 124 are rigidly connected to one another by way of a push strut 142 which in the present exemplary embodiment is U-shaped in cross-section, with the entraining carriages 124 being arranged spaced evenly from one another. For this purpose, the push strut 142 is secured to the respective upwardly pointing short face 144 of the carriage plate 126 (cf. FIG. 5) of each entraining carriage 124. In the region between two adjacent entraining carriages 124, the push strut 142 is made thicker, and includes profiles integrally formed there on both sides, of which a profile 142a can be seen in FIG. 7. The push strut 142 and the entraining carriage 124 thus together form a conveying slide 143.

The push strut 142 has approximately the same length as the object to be treated in each case, so in the present case it has approximately the same length as the rotor blade 12, with the entraining carriage 124a which is furthest forward being mounted at its front end, as seen in the direction of transport 20, and an entraining carriage 124 which is furthest back and which is not visible in the figures being mounted at its back end as seen in the direction of transport 20. The corresponding entraining carriage 124 which is furthest back is thus arranged below the back end of the rotor blade 12, as seen in the direction of transport 20.

The conveying system 22 of the system 10 further includes a leading transport carriage 146, as seen in the direction of transport 20, and a trailing transport carriage 148, as seen in the direction of transport 20, which receive the rotor blade 12 at the securing end 150 thereof and at its opposing free end region 152 respectively. For this purpose, the transport carriages 146 and 148 have corresponding holding structures 154 and 156 respectively, but these are of no further interest here.

As can be seen in FIGS. 6 to 9, the leading transport carriage 146 includes a frame structure 158 which houses a total of four roller pairs 160, and these each include two rollers 162 which are arranged one behind the other and are rotatable about horizontal axes of rotation standing perpendicular to the direction of transport 20. The transport carriage runs by means of two roller pairs 160 on a first length of rail 164a which runs on the left as seen in the direction of transport 20, alongside the floor duct 86. The transport carriage 146 runs by means of the other two of the four roller pairs 160 on a second length of rail 164b which runs on the right as seen in the direction of transport 20, alongside the floor duct 86 (cf. FIG. 8).

The lengths of rail 164a, 164b take the form of round rails having a circular cross-section, and for this reason the rollers 162 have a roller face 166 which is arcuate in cross-section in a manner complementing this and by means of which they lie on the respective length of rail 164a or 164b.

Mounted on the front side 168 of the leading transport carriage 146, which points in the direction of transport 20, is a coupling rod 170 which projects vertically downwards (cf. FIG. 7). The coupling rod 170 engages by means of its lower end 172 in a cutout 174 in the push strut 142; this cutout 174 is complementary with the lower end 172 and is arranged approximately centrally above the entraining carriage 124a that is furthest forward as seen in the direction of transport 20. In this way, the leading transport carriage 146 is coupled to the push strut 142.

As can be seen in particular from FIGS. 5 and 8, the floor duct 86 is largely covered at the top by two cover sheets 176a, 176b between which there remains a passage slot 178, through which the coupling rod 170 of the leading transport carriage 146 projects downwards to the push strut 142.

Figure 9:
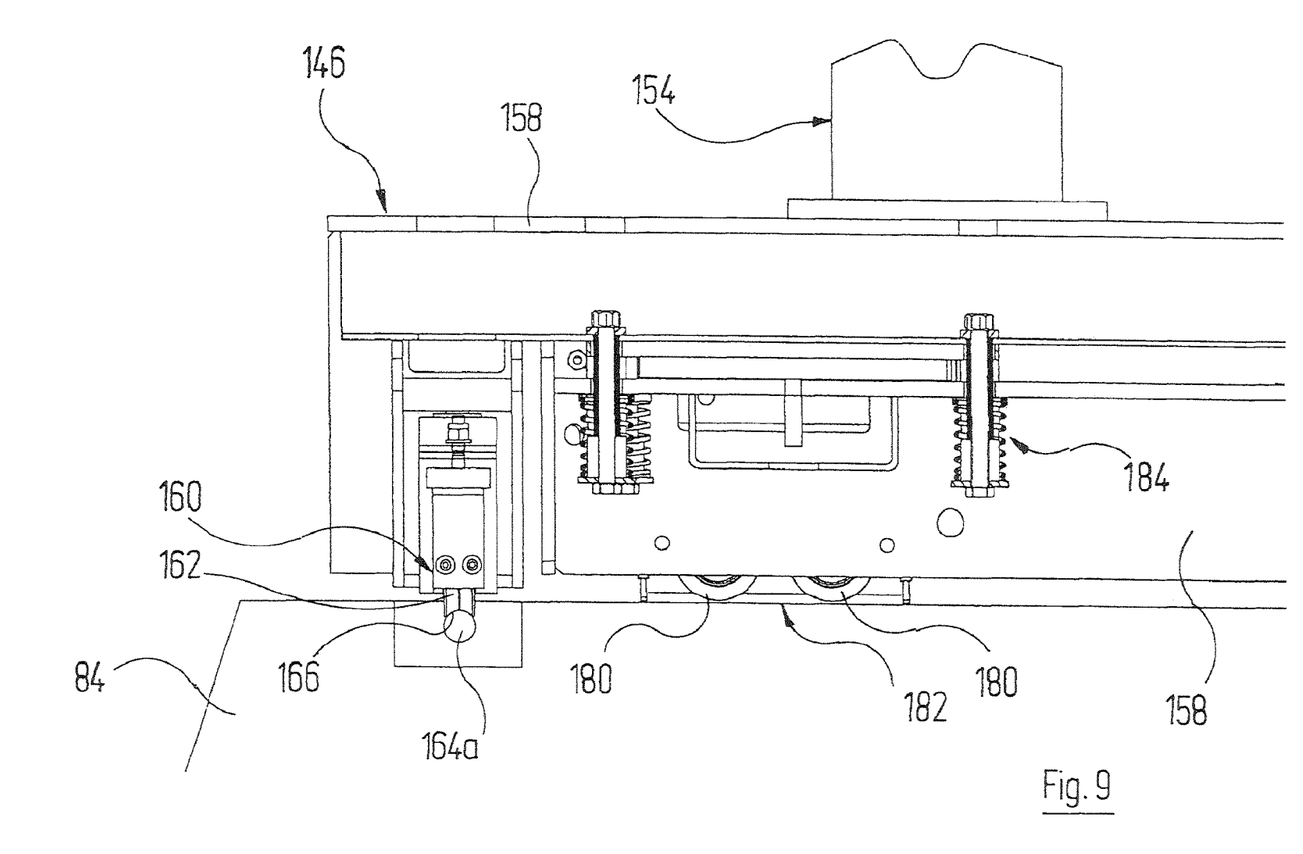
FIG. 9 shows a detail of FIG. 8, on an even larger scale.

The transport carriage 146 can be moved not only on the lengths of rail 164a, 164b in the direction of transport 20 or in the opposite direction thereto, but may also be displaced transversely in relation thereto. To this end, the transport carriage 146 has four roller pairs 180 each having two rollers 182, whereof the horizontal axis of rotation in each case perpendicular to the axes of rotation of the rollers in each case includes two rollers 162 arranged one behind the other, as can be seen in FIGS. 8 and 9. In each case one roller pair 180 is arranged offset inwards from each corner region of the frame structure 158 of the transport carriage 146 and opposite the rollers 162.

The rollers 182 may be extended downwards and retracted again in relation to the frame structure 158 of the transport carriage 146, by means of a raising/lowering means 184 (cf. FIGS. 8 and 9) which is associated with each roller pair 180 but is not of further interest here. When the rollers 182 are extended downwards, they take up the load of the frame structure 158 and the rotor blade 12 mounted thereon, with the rollers 162 raised away from the lengths of rail 164a, 164b and located above the level of the floor. In this position, the transport carriage 146 can be moved on the rollers 182 perpendicular to the direction of transport 20, and for this purpose a corresponding rail system, known per se, for the rollers 182 may optionally be provided.

The trailing transport carriage 148 differs from the leading transport carriage 146 only to the extent that no coupling rod 170 is provided there.

The system 10 described above operates as follows:

The rotor blade 12 which is to be painted in the spray booth 16 is connected at its securing end 150 to the holding structure 154 of the leading transport carriage 146, and at its opposing end region 152 to the holding structure 156 of the trailing transport carriage 148.

If the transport carriages 146 and 148 are not already in the supply region 14 upstream of the spray booth 16, they are moved there, together with the rotor blade 12, for which purpose the option indicated above, of being able to move the transport carriages 146 and 148 transversely in relation to the direction of transport 20, may be used. In the supply region 14, the transport carriages 146 and 148 are put above the lengths of rail 162a, 162b by means of their rollers 162, with the roller pairs 180 adopting their extended position by means of the respective raising/lowering means 184. At the same time, the transport carriages 146, 148 are positioned such that the coupling rod 170 of the leading transport carriage 146 is located downstream of the clamping station 92, as seen in the direction of transport 20.

Then, the push strut 142 is positioned below the rotor blade 12 such that the free end 172 of the coupling rod 170 of the leading transport carriage 146 comes to lie above the cutout 174 in the push strut 142. For this purpose, the conveyor chain 90 is driven by means of the drive station 96 in one of the possible directions of circulation. The entraining carriages 124, which are in engagement with the conveyor chain 90 by way of their entraining comb 136, are entrained by the conveyor chain 90 in the corresponding direction, as a result of which the push strut 142 is moved along the guide rail 118.

The roller pairs 180 are now retracted by means of the respective raising/lowering means 184 such that the transport carriages 146 and 148 are lowered, with their carrying rollers 162, onto the lengths of rail 164a, 164b and at the same time the coupling rod 170 engages by means of its lower end 172 in the cutout 174 in the push strut 142. In this way, the leading transport carriage 146 is coupled to the push strut 142. The trailing transport carriage 148 is for its part connected to the leading transport carriage 146 by way of the rotor blade 12.

The conveyor chain 90 is then driven by means of the drive station 96 such that its upper side 116 is moved in the direction of transport 20. The conveyor chain 90 carries along the entraining carriage 124a furthest forward, which is in engagement therewith, in the direction of transport 20. Because the front entraining carriage 124a is connected to the push strut 142 and the latter is coupled to the leading transport carriage 146, the latter and the trailing transport carriage 148 are also moved, with the rotor blade 12, in the direction of transport.

Once the leading transport carriage 146 has reached the entry 26 to the spray booth 16, the passage 74 between the roller gate leaves 54, 56 and 58 of the booth gate 30, which has been closed up until this, is widened far enough for the transport carriage 146 to fit through. For this purpose, the vertical roller gate leaves 54 and 56 are moved into a suitable position by means of the electric motors 62 and 70. The height of the passage 74 is adapted to the height of the securing end 150 of the rotor blade 12 by the horizontal roller gate leaf 58 being put into a suitable position by means of the electric motor 78.

As soon as the leading transport carriage 146 has passed the booth gate 30 at the entry 26 to the spray booth 16, the vertical roller gate leaves 54 and 56 are moved towards one another far enough for their outer edges 64 and 66, which laterally delimit the passage 74, to come to lie closely alongside the rotor blade 12. As the rotor blade 12 travels through the entry 26 to the spray booth 16, the roller gate leaves 54, 56 and 58 are respectively put into a position, as a result of corresponding triggering of the electric motors 62, 70 and 78, such that the passage 74 at the entry 26 to the spray booth 16 is always adapted as well as possible to the cross-sectional external contour of the rotor blade 12. The required triggering of the roller gate leaves 54, 56, 58 may for example be calculated using an image capture system. It is also possible for a pre-programmed contour shape of the rotor blade 12, in conjunction with position sensing of at least one of the transport carriages 146, 148, to serve as the basis for triggering the roller gate leaves 54, 56, 58.

The conveyor chain 90 is driven continuously by the drive station 96 such that the rotor blade 12 is moved evenly past the application robots 40, 42 in the spray booth 16 and in so doing is painted.

Once the leading transport carriage 146 has reached the exit 28 of the spray booth 16, the booth gate 32 there, which has been closed up until this, is triggered in the same manner as the booth gate 30 at the entry 26 to the spray booth 16. The corresponding passage through the exit booth gate 32 is consequently always adapted as far as possible to the cross-sectional external contour of the region of the transport carriages 146, 148 or the rotor blade 12 which is currently passing through the booth gate 32 at the exit 28 of the spray booth 16.

As the rotor blade 12 is moved in the direction of transport 20, the entraining carriages 124 which are trailing the entraining carriage 124a furthest forward gradually reach the clamping station 90, and there engage in the upper side 116 of the conveyor chain 90 by way of their entraining comb 136. The push strut 142 is thus always driven by the entraining carriages 124 that are between the clamping station 90 and the drive station 92.

After a certain time, the entraining carriage 124a which is furthest forward reaches the drive station 92 downstream of the spray booth 16 and is moved beyond this, since the push strut 142 continues to be driven by the conveyor chain 90 by way of the trailing entraining carriages 124. Once the entraining carriage 124a that is furthest forward comes downstream of the drive station 92, as seen in the direction of transport 20, its entraining comb 136 no longer engages in the conveyor chain 90. Because the entraining carriages 124 which are trailing the entraining carriage 124a which is furthest forward are still in engagement with the conveyor chain 90, however, advance of the push strut 142 and the leading transport carriage 146 coupled thereto is maintained without there being any change in speed.

The rotor blade 12 is always coupled to the conveyor chain 90 by way of the entraining carriages 124, along the drive distance that is predetermined by the upper side 116 of the conveyor chain 90. Overall, it is sufficient for a single one of the entraining carriages 124 to be located between the clamping station 90 and the drive station 92 of the conveyor chain 90 and hence to be in engagement therewith for continuous and even advance of the rotor blade 12 to be maintained, even though the drive distance is shorter than the transport length of the rotor blade 12.

Once the rotor blade 12 has been conveyed in its entirety through the spray booth 16, it is in the transfer chamber 18. There, the push strut 142 adopts a position in which the entraining carriage 124 that is furthest back, as seen in the direction of transport 20, still engages in the conveyor chain 90. Because this entraining carriage 124 is arranged below the back end of the rotor blade 12, as seen in the direction of transport 20, it is ensured that the rotor blade 12 has been moved into the transfer chamber 18 in its entirety.

The transport distance covered by the rotor blade 12 thus corresponds to the length between the position of the entraining carriage 124 that was furthest back at the beginning of conveying, when the rotor blade 12 was arranged in the supply region 14, and the position which the entraining carriage 124 furthest back now occupies. The transport distance which the rotor blade 12 can cover is thus longer than the drive distance of the conveying system 22, which is predetermined by the upper side 116 of the conveyor chain 90.

The rotor blade 12 is conveyed out of the transfer chamber 18 by the roller pairs 180 being extended by means of the raising/lowering means 184, as a result of which the transport carriages 146 and 148 are raised away from the lengths of rail 164a, 164b. For this purpose, the transport carriages 146, 148 may be moved, with the rotor blade 12 which has now been coated, transversely in relation to the direction of transport 20, and the latter may be supplied to a further operation or treatment.

The conveyor chain 90 is now driven in the opposing direction of circulation, as a result of which the push strut 142 is moved in opposition to the direction of transport 20, back to the supply region 14. There, the push strut 142 may be coupled again in the manner explained above, using coupling rod 170, to a transport carriage 146 which carries a rotor blade 12 which is as yet untreated. The latter may then be guided through the spray booth 16 and painted there in the manner explained above.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A system for the surface treatment of objects, comprising:
    a treatment booth with an entry and an exit;
    a conveying system which includes a pulling device or a pushing device for conveying an object by passing through the treatment booth in a direction of transport, and in so doing covering a transport distance; wherein
    the object predetermines a transport length that is associated therewith in the direction of transport, and
    the pulling device or the pushing device predetermine a drive distance in the direction of transport such that the transport distance, the transport length, and the drive distance are parallel to the direction of transport;
    wherein
    the conveying system includes a coupling device for coupling the object to the pulling device or the pushing device along the drive distance;
    wherein the drive distance is shorter in the direction of transport than the transport length of the object; and
    wherein the coupling device is set up such that the transport distance to be covered by the object is longer than the drive distance.

2. The system of claim 1, wherein the pulling device or the pushing device comprise a circulating conveyor chain, with the drive distance predetermined by at least one region of one side of the conveyor chain.

3. The system of claim 1, the coupling device comprises a conveying slide which
    is longer in the direction of transport than the drive distance;
    and, which includes a plurality of entraining elements which are arranged along the conveying slide spaced from one another in the direction of transport and may cooperate with the pulling device or the pushing device; and
    which is movable in the direction of transport in a guide structure.

4. The system of claim 3, wherein the conveying slide has a length corresponding approximately to the transport length of the object.

5. The system of claim 3, wherein the conveying system includes at least one transport carriage which receives the object and which is connectable to the conveying slide.

6. The system of claim 1, wherein the treatment booth has at the entry and/or at the exit a booth gate which includes at least one gate leaf that is movable in a first direction and at least one gate leaf that is movable in a second direction.

7. The system of claim 6, wherein the first direction runs vertically and the second direction runs horizontally.

8. The system of claim 6, wherein two gate leaves which are movable in the first direction are provided.

9. The system of claim 2, wherein the coupling device comprises a conveying slide which is longer in the direction of transport than the drive distance; and which includes a plurality of entraining elements which are arranged along the conveying slide spaced from one another in the direction of transport and may cooperate with the pulling device or the pushing device; and which is movable in the direction of transport in a guide structure.

10. The system of claim 3, wherein the conveying system includes at least one transport carriage which receives the object and which is connectable to the conveying slide.

11. The system of claim 2, wherein the treatment booth has at the entry and/or at the exit a booth gate which includes at least one gate leaf that is movable in a first direction and at least one gate leaf that is movable in a second direction.

12. The system of claim 3, wherein the treatment booth has at the entry and/or at the exit a booth gate which includes at least one gate leaf that is movable in a first direction and at least one gate leaf that is movable in a second direction.

13. The system of claim 4, wherein the treatment booth has at the entry and/or at the exit a booth gate which includes at least one gate leaf that is movable in a first direction and at least one gate leaf that is movable in a second direction.

14. The system of claim 5, wherein the treatment booth has at the entry and/or at the exit a booth gate which includes at least one gate leaf that is movable in a first direction and at least one gate leaf that is movable in a second direction.

15. The system of claim 7, wherein two gate leaves which are movable in the first direction are provided.

16. The system of claim 6 wherein at least one gate leaf that is movable in a first direction is a roller gate leaf and the at least one gate leaf that is movable in a second direction is a roller gate leaf.

* * * * *